3,000,876
HEAT STABLE CELLULOSE ACETATE SULFATES
George P. Touey and John E. Kiefer, Kingsport, Tenn., assignors to Eastman Kodak Company, Rochester, N.Y., a corporation of New Jersey
No Drawing. Filed May 14, 1959, Ser. No. 813,061
5 Claims. (Cl. 260—215)

This invention relates to rendering cellulose acyl sulfates stable to heat and storage which comprises incorporating a small amount of urea therein.

Conventional lower fatty acid esters of cellulose are comparatively stable to heat and storage. These esters, however, have been stabilized by the substantial removal of combined sulfur therein in their manufacture. The salts of cellulose sulfate, such as sodium cellulose sulfate, are ordinarily stable to heat. For instance, sodium cellulose sulfate can be heated to 150° C. for several hours without any serious degradation occurring. Cellulose acyl sulfates and their salts, such as sodium cellulose acetate sulfate, ordinarily exhibit charring when heated to 150° C. or upon long storage at 40° C.

One object of our invention is to improve the heat and storage stability of cellulose acyl sulfates and their salts. Another object of our invention is to provide cellulose acyl sulfates having there in a small proportion of urea. Other objects of our invention will appear herein.

We have found that cellulose acyl sulfates are improved in stability if a small proportion of urea is incorporated therein. The cellulose esters stabilized in accordance with our invention are those esters having a combined sulfur content of at least 5%, the remainder of the acid radicals therein other than sulfur radicals being acyl groups such as acetyl, propionyl or butyryl. We have found that if an amount of urea of at least 0.1% is incorporated in these esters that improvement in the resistance of those esters to charring when subjected to elevated temperatures such as 150° C. results.

The urea may be incorporated into the cellulose ester by any convenient technique such as by mixing the urea and the cellulose acyl sulfate together in dry powder form or by spraying the dry ester with a solution of urea. A convenient method of incorporating urea is a slurry method comprising dissolving the urea in a nonsolvent for the cellulose ester and incorporating it in a slurry of the cellulose ester with good mixing. The excess liquid is then filtered off leaving the ester wet with urea solution which ester is then dried. An equivalent procedure comprises adding urea to the last wash employed in recovering the cellulose ester from the bath employed in its preparation.

It has been found that as little as 0.1% of urea based on the weight of the cellulose ester gives improvement in the resistance of the cellulose ester to discoloration upon heating. However, the range of urea content preferred to obtain good resistance to the effects of heat is 1–5% based on the weight of the cellulose ester. Cellulose acetate sulfate, particularly its sodium salt, is useful for coatings of various types. The water soluble alkali metal salts are especially suitable for coating purposes where an easily removable coating is desired such as antistatic backing for photographic film.

The following examples illustrate our invention.

Example 1

A water soluble cellulose acetate sulfate was prepared as follows:

100 parts of acetylation grade wood pulp were mixed with 300 parts of acetic acid and the mass was cooled to 17° C. A mixture was added thereto over a 1 hour period consisting of acetic acid, 200 parts of acetic anhydride and 75 parts of sulfuric acid while the temperature was maintained at 17–20° C. The reaction was continued at this temperature until the wood pulp was completely in solution (5 hours). 50 parts of anhydrous sodium acetate was then added over a period of 1 hour and sodium cellulose acetate sulfate precipitated. The precipitate was filtered, washed with 87% isopropanol and was neutralized with sodium carbonate. The wet material was divided into 8 portions, which portions were slurried with a solution of urea in isopropanol for 30 minutes to result in proportions indicated below and then filtered to approximately 1:1 liquid-to-solids ratio and dried. The dried samples were put in an oil bath for 8 hours. The results are tabulated below:

| Percent Urea in Dried Sample | Heat Stability (150° C.) |
|---|---|
| None | 15 min.—char. |
| 0.1% | 2 hr.—black spots, 4 hr. char. |
| 0.5% | 4 hr.—light brown, 8 hr. char spots. |
| 1.0% | 8 hr.—very slight coloration. |
| 2.0% | 8 hr.—white. |
| 3.0% | 8 hr.—white. |
| 4.0% | 8 hr.—white. |
| 5.0% | 8 hr.—white. |

Example 2

A water soluble cellulose acetate was prepared by mixing 100 parts of wood pulp with 300 parts of acetic acid and cooling to 18° C., adding thereto over a 1 hour period a mixture of 350 parts of acetic acid, 280 parts of acetic anhydride and 180 parts of sulfuric acid and maintaining the temperature at 17–19° C. for 4 hours, at the end of which time the wood pulp had completely dissolved. 115 parts of anhydrous sodium acetate was added over a period of 1 hour and sodium cellulose acetate sulfate precipitated therefrom. The precipitate was filtered, washed with 87% isopropanol and neutralized with sodium carbonate. The product was divided into 8 parts, each portion was slurried in a solution consisting of 86% isopropanol, 13% water and 1% of an acid acceptor type stabilizer. The samples were filtered to a liquids-to-solids ratio of 1:1 leaving 1% stabilizer on the cellulose ester. The samples were dried and put in an oil bath maintained at 150° C. for 8 hours. The results obtained were as follows:

| Stabilizer (1 part/100 parts Cellulose Ester) | Heat Stability |
|---|---|
| None | 150° C., 15 min.—char. |
| Urea | 150° C., 4 hr.—white. |
| Acetamide | 150° C., 30 min.—char. |
| Melamine | 150° C., 1½ hr.—char. |
| Dicyandiamide | 150° C., 1½ hr.—char. |
| Sodium acetate | 150° C., 1 hr.—brown 4 hr.—char. |
| Potassium acid oxalate | 150° C., 1½ hr.—char. |
| Biuret | 150° C., 1½ hr.—char. |

Example 3

A water soluble cellulose acetate sulfate was prepared by the method described in Example 1 and was divided into two portions. One portion was slurried in 87% isopropanol and dried. The other was slurried in a solution consisting of 86% isopropanol, 13% water, and 1% of urea, following which the mass was filtered to a 1:1 liquid-to-solids ratio and dried. Both samples were stored in closed bottles at 40° C. After six months' storage the bottles were opened. The portion containing no urea was black and gave off a strong odor of acetic acid. The sample which contained urea was white and free of odor.

We claim:

1. A water soluble cellulose acyl sulfate salt having a combined sulfur content of at least 5% containing a stabilizing amount of urea.

2. A water soluble cellulose acetate sulfate salt having a combined sulfur content of at least 5% containing a stabilizing amount of urea.

3. A water soluble cellulose acyl sulfate salt having a combined sulfur content of at least 5% in which 1–5%, based on the weight of the cellulose ester, of urea has been incorporated.

4. A water soluble cellulose acetate sulfate salt having a combined sulfur content of at least 5% containing 1–5% of urea.

5. In the preparation of a stable water soluble cellulose acetate sulfate salt in which cellulose is esterified with esterification bath consisting of acetic acid, acetic anhydride and sulfuric acid so as to impart a combined sulfur content of at least 5% in which an alkali metal neutralizing agent is added and the salt of cellulose acetate sulfate precipitates, following which the precipitate is washed and dried, the step which comprises employing as the last washing for the cellulose ester a washing liquid containing a small amount of urea in solution therein.

References Cited in the file of this patent

UNITED STATES PATENTS

| | | |
|---|---|---|
| 1,607,474 | Mork | Nov. 16, 1926 |
| 1,866,532 | Haskins | July 12, 1932 |